Patented Jan. 13, 1953

2,625,508

UNITED STATES PATENT OFFICE 2,625,508

WATER RESISTANT GREASE

Fred H. Stross, Berkeley, Calif., assignor to Shell Development Company, Emeryville, Calif., a corporation of Delaware No Drawing. Application February 13, 1951, Serial No. 210,799

13 Claims. (Cl. 252—21)

This invention pertains to the art of grease formation. More particularly, it is related to novel greases having improved stability with respect to mechanical action and the deleterious effects of water.

Greases known to the prior art have been gelled by the presence of soaps such as stearates, hydroxy stearates, magohany sulfonates and alkylated succinates. More recently, greases exhibiting high dropping points and other unusual properties have been prepared by the use of inorganic gelling agents, such as silica and the like. The latter type of greases are especially useful for high temperature purposes.

While greases gelled with inorganic colloids show minimum response to thermal changes they are exceptionally sensitive to disintegration by the action of water. Moreover, many of them exhibit relatively low stability to working, as exhibited in the accepted "roll tests." On the other hand, greases gelled by the presence of soaps soften or become fluid at relatively low temperatures. Moreover, especially in the case of the sulfonate soaps, a low yield value is experienced requiring the use of exceptionally large amounts of soaps. This same feature is true of greases gelled with soaps of alkenyl- or alkyl-succinic acids.

It is an object of the present invention to provide improved grease compositions. It is a second object of this invention to provide greases gelled with inorganic colloids. It is a further object of this invention to provide water protection for this type of greases. Another object comprises the improvement in roll stability of said greases. Other objects include the improvement in yield value of greases containing sulfonate soaps or soaps of dicarboxylic acids. Other objects will become apparent from the following description of the invention.

Now, in accordance with this invention, it has been found that lubricants comprising oleaginous materials thickened to a grease-like consistency and containing at least a thickening amount of inorganic colloids may be materially improved by the presence therein of a minor amount of a hydrophobic metallic soap of an organic acid as more fully described hereinafter. Still in accordance with this invention, it has been found that greases containing the above ingredients exhibit superior resistance to the action of water and also show improved roll stability. Further, in accordance with the invention, it has been found that the yield value of sulfonate soaps and dicarboxylic acid soaps may be substantially improved by the presence of inorganic colloidal gels while at the same time the latter are protected from disintegration by the presence of soap.

Briefly, therefore, the compositions of this invention comprise the following ingredients in the following approximate proportions:

Inorganic colloidal gel, 1–20% by weight
Hydrophobic soap, minor amount based on the inorganic gel
Oleaginous organic liquid, major amount The inorganic colloidal materials useful for the preparation of the present greases include numerous types of inorganic colloids exemplified by silica, alumina, magnesia and mixtures thereof. Inorganic substances forming colloidal gels include inorganic oxides, such as those already named as well as ferrous and ferric oxides, vanadium oxide and mixtures of magnesium oxide with silica or of alumina with silica. Inorganic metallic hydroxides likewise may be employed either as the sole inorganic colloid or in admixture with others enumerated herein. Typical species include lime and magnesium hydroxide. Silicates may be employed, such as magnesium silicate, calcium silicate and aluminum silicate. Calcium sulfate may be used, or the corresponding carbonate or phosphate.

The inorganic colloidal material must be prepared in a colloidally gelled state capable of forming a grease-like structure with the oleaginous vehicles, which will be disclosed hereinafter. The exact character of this desirable state of subdivision is not subject to precise description. However, it has been found that the most suitable inorganic colloidal gels for use in the present compositions have an approximate surface area of from about 200 to about 750 square meters per gram as determined by adsorption of a monolayer of nitrogen in accordance with well-known techniques. Examination by electron microscope reveals the fact that most of these inorganic colloidal gels comprise amorphous particles having a diameter of from about 5 to about 100 millimicrons. It will be appreciated that in any given gel preparation, particles of smaller or greater size are undoubtedly formed. However, it is preferred practice to employ gels wherein the major amount, and preferably at least about 75% of the material has the particle size within the above limitations.

Gels, such as those described, may be prepared by numerous methods known to the art. These include especially the "aerogel" technique, alcohol transfer and "direct transfer" from water. In all of these cases the gel as firmly dispersed in the oleaginous vehicle is in a highly expanded state usually having the surface area and/or particle size measurements within the ranges given above. In aerogel preparation, the following process is typical: Silica hydrogel is formed by the addition of sulfuric acid to sodium silicate solution and and is washed relatively free of salts with water.

The water is then displaced by a water-miscible low boiling solvent such as alcohol or acetone. The gel so prepared is then placed in an autoclave and the temperature then raised to a value above the critical temperature of the solvent contained therein, while maintaining the pressure on the system sufficiently high to ensure maintenance of the solvent as a single fluid phase. Above the critical temperature pressure is released and the fluid withdrawn without the formation of menisci at a gas-liquid interface. By this process, highly porous anhydrous gels are formed having substantially the same degree of expansion as when filled with either the water or the replacement liquid.

While aerogel formation was one of the earlier techniques employed in inorganic gel preparation, the method is one involving considerable expense due to the autoclave treatment necessary. A desirable improvement on this process comprises replacement of water in the hydrogel with an organic solvent such as acetone, ether, alcohol or the like and subsequently mixing the resulting organogel with the oleaginous vehicle from which the grease is to be formed. After the grease forming ingredients have been intimately mixed, such as by milling, or other dispersing means, the volatile solvent replacing the original water is then removed by the use of heat, pressure reduction or both. While this process constitutes an economic improvement over the aerogel process, the more desirable features of the preparation are minimized by the expense entailed in alcohol losses and an alcohol distillation equipment. Therefore, the "direct transfer" process is believed to be the most desirable process for the preparation of the present greases.

Broadly, it has been found that hydrogels may be directly transferred into the oleaginous vehicle without resorting either to the aerogel process or the alcogel process. In general, this direct transfer is most suitably accomplished by mixing the inorganic hydrogel with the oleaginous fluid vehicle in the presence of a surface-active agent, preferably one exhibiting hydrophobic properties. This surface-active agent may be incorporated in the hydrogel or initially dispersed in the oleaginous vehicle. Alternatively, it may be formed simultaneously with the hydrogel or it may be formed at the time the hydrogel is incorporated in the oleaginous vehicle. Typical preparations by each of these alternatives are as follows:

Silica hydrogel is prepared according to known methods and then modified by the addition of a hydrophobic soap, such as aluminum stearate. Preferably, this is added in a hot condition and the hydrogel-soap mixture is preferably near but below the boiling point of water. Under these conditions, when aided by the use of rapid stirring, an emulsion of the soap in the hydrogel occurs. Subsequently, this emulsion is intimately mixed with the oleaginous vehicle, such as a mineral lubricating oil. The ingredients are subjected to further mixing in order to distribute the hydrogel and soap uniformly and in a fine state of subdivision throughout the oil. Simultaneously, or subsequently, the temperature of the entire mixture is raised to a value at which water is expelled from the system. When the ingredients are anhydrous it will be found that the inorganic gel and soap are readily dispersible throughout the oleaginous vehicle to form a grease structure.

Alternatively, the inorganic hydrogel may be added to the oleaginous base (such as lubricating oil) which already contains the soap, such as lead 12-hydroxy stearate. Under these circumstances, the steps are substantially the same. After "pre-milling" (comprising fine dispersal of the hydrogel throughout the oil) water is removed as described above. Shearing or colloidizing of the remaining anhydrous ingredients then produces the required grease structure.

Finally, the alternative may be employed of forming soaps in situ either in the hydrogel or in the oleogel. Under the first alternative, a hydrogel is prepared containing, for example, not only silica as the major inorganic gel, but also a certain amount of a soap-forming base, such as aluminum hydroxide preferably in colloidal form. Thereafter a high molecular weight acid such as stearic acid is added to the hydrogel under such conditions of time and temperature that aluminum stearate is formed and immediately deposited on the surface of the hydrogel particles. Of course, this alternative may be varied by the presence of a soap-forming acid in the oil, and a soap-forming base reactive therewith present in the added hydrogel. In either case, the soap is formed under the most favorable conditions for complete dispersal throughout the gel structure. A further modification of "in situ" preparation comprises, for example, the incorporation of a water-soluble alkali metal soap (sodium stearate) in aqueous sodium silicate, incorporation of a water-soluble, polyvalent metal salt (aluminum sulfate magnesium sulfate) in aqueous inorganic acid (sulfuric acid, hydrochloric acid) followed by admixing of the two mixtures in appropriate proportions to form simultaneously silica hydrogel and water-insoluble, polyvalent metal soap, and washing to remove inorganic salts.

The hydrophobic metallic soaps of organic acids which may be used in the present compositions include as a preferred group, the amphoteric metal salts such as aluminum soaps of higher fatty acids. Another preferred group of soaps include the hydrophobic soaps of hydroxy fatty acids, such as lithium 12-hydroxy stearate. The metallic radicals of the soaps may include one or more of the following typical metals: copper, cobalt, nickel, cadmium, mercury, strontium, zinc, lead, aluminum, lithium and iron. These metals form the metallic radical in soaps derived from organic acids including especially fatty acids, hydroxy fatty acids, aliphatic dicarboxylic acids, sulfonic acids, rosin acids and naphthenic acids.

Suitable hydroxy fatty acids combined with the metallic radical to form a soap are exemplified by the following:

9-, 10-, 11-, or 13-hydroxy stearic acids
10-, or 15-hydroxy palmitic acid
1-hydroxy behenic acid
1-hydroxy myristic acid
5,6-dihydroxy stearic acid
2,11-dihydroxypalmitic acid
6,7-, 7,8-, 8,11-, 9,10-, and 10,11-dihydroxy stearic acid
12-hydroxy stearic acid (preferred species)

Specific members of the soaps formed from the above acids include aluminum 12-hydroxy stearate zinc 9,10-dihydroxy stearate and lithium 2,11-dihydroxy palmitate.

The corresponding fatty acids may be employed either alone or together with other soap forming acids for the formation of soaps to be used in the present compositions. Typical fatty acids are those having at least 12 carbon atoms in the hydrocarbon radical thereof, such as oleic, linoleic, palmitic, stearic, myristic, arachidic and behenic acids. Specific suitable soaps formed from this class of acids include aluminum oleate, zinc stearate, lead oleate, cobalt palmitate, and iron oleate.

A special group of soaps useful in the subject corresponding compositions include the alkyl- or alkenyl-substituted aliphatic dicarboxylic acid soaps. The alkyl or alkenyl radical thereof should have from 8 to 25 carbon atoms and preferably from 8 to 18 carbon atoms. Usually, the most suitable acids for soap formation are those derived from fumaric, succinic, maleic, citraconic, gluconic or adipic acids. The preferred class of this type of acid includes the alkenyl succinic acids prepared by condensing a polymer of a lower molecular weight olefin (propylene), or higher molecular weight cracked wax olefins with maleic anhydride and saponifying or hydrolyzing to the corresponding alkenyl succinic acids. Ordinarily, the most suitable polymer for substitution in this manner is a propylene polymer having from 9 to 18 carbon atoms and preferably from 9 to 12 carbon atoms. The most easily dispersed soaps of this category include the magnesium, beryllium or aluminum soaps which may be used as the sole soap ingredient or may be mixed with other poly-basic soaps or mono-basic soaps. They may be deposited during hydrogel formation, for example, directly upon the gel surface so that the oil miscibility thereof is not necessarily a major criterion of their effectiveness.

A further class of soaps useful in these compositions include the hydrophobic soaps of high molecular weight sulfonic acids, preferably the oil-soluble hydrocarbon sulfonic acids having molecular weights above about 300 and preferably between about 350 and 600. The preferred varieties of this class include zinc, aluminum and lithium soaps and the most effective member consists of the zinc soaps of alkylaryl sulfonic acids derived from the manufacture of white oils in petroleum refining.

A special class of soaps most suitably employed as mixed soaps with fatty acids includes the polyvalent metal soaps of dimerized fatty acids, or the alicyclic, non-aromatic dicarboxylic acids analogous thereto. The most typical member of this group includes the dimerized fatty acid obtained by heating unsaturated fatty acids in the presence of a small amount of water at a temperature between about 300 and 360° C. for 3–8 hours under a pressure of 385–400 pounds per square inch. For use in the present invention, this dimerized fatty acid is preferably mixed with a substantial amount of fatty acids, such as stearic acid and dispersed in water. Subsequently, the mixture of acids is saponified with sodium hydroxide to form a mixture of sodium soaps. The mixed aluminum soap is then formed by the addition of aluminum sulfate. Following washing, the mixed soap may then be incorporated either in the inorganic hydrogen or more preferably in the lubricating oil. The use of these dimerized acids has been found to cause an unexpected improvement in the yield of greases prepared from their mixed soaps.

Other special acids used in the preparation of the present soaps include rosin acids, naphthenic acids especially from petroleum origin and mixtures of naturally occurring acids obtained by the hydrolysis of animal oils or vegetable oils.

The term "hydrophobic" as applied in the present case is meant to include soaps which do not dissolve readily in water even though they may become dispersible to a limited degree therein upon extended water action.

The oleaginous fluid vehicles useful in the formation of the greases of this invention include both natural and synthetic lubricants.

The base lubricant for forming lithium soap greases by the process of this invention may be selected from a wide variety of natural and synthetic oils. Mineral oils of wide viscosity range varying from about 50 to 2000 S. U. S. at 100° F. and having a viscosity index of from below zero to about 80 can be used as well as their mixtures. A preferred mineral oil base may be prepared by redistilling a gas oil over caustic soda, extracting the distillate with sulfur dioxide and refining the raffinate with a suitable adsorbent material to give an oil having the following properties:

| | |
|---|---|
| Specific gravity at 60° F | 0.861 |
| Flash point, ° F | 275 |
| Pour point, ° F | −70 |
| Final B. P., ° C. (ASTM) | 370 |

| | S. G. oil (60 F.) | Flash point closed (° F.) | Viscosity red I (secs.) | | K. V. I. | Pour point, ° F. | Leendertse type analysis | | |
|---|---|---|---|---|---|---|---|---|---|
| | | | 140° F. | 70° F. | | | Aromatics | Paraffins | Naphthenes |
| A | 0.861 | 275 | | 61 | 64 | Minus 70 | 2 | 50.5 | 47.5 |
| B | .828 | 275 | | 44 | | 25 | 6 | 67 | 27 |
| C | .867 | 300 | 45 | | 55 | Minus 40 | 1 | 50 | 49 |
| D | .934 | 370 | 95 | | 10 | Minus 20 | 18.6 | 50.5 | 30.9 |
| E | .904 | 410 | 165 | | 46 | Minus 15 | 10 | 53 | 37 |

Mixtures of mineral oil and fixed oils such as castor oil, lard oil and the like can be used as well as organic synthetic lubricants and mixtures thereof such as:

I. Synthetic lubricants produced by the Fischer-Tropsch, Synthol, Synthine and related processes, e. g.:
    A. Polymerization of olefins such as ethylene, butylene, and the like, and their mixtures in presence of a Friedel-Crafts or other type condensation catalyst under elevated temperatures and pressures.
    B. Polymerization of unsaturated hydrocarbons in presence of a catalyst and then condensing said polymerized product with an aromatic hydrocarbon such as xylol, benzol, naphthalene, etc.
    C. Oxidation of polymerized olefins of lubricating range as noted under A and B.
    D. Process of converting natural gas to carbon monoxide and hydrogen, followed by catalytic reaction under elevated temperature and pressure to produce hydrocarbons of lubricating range (Synthol process).

II. Synthetic lubricating products produced by the Bergius process, e. g., by:
  A. Hydrogenation of coal, peat, and related carbonaceous materials under pressure and elevated temperature in presence of a catalyst.
  B. Hydrogenation of asphalts, petroleum residues and the like.
III. Synthetic lubricants produced by the Voltolization process, e. g., by:
  A. Voltolization of fatty materials such as fatty oils.
  B. Voltolization of mixtures of fatty oils and petroleum hydrocarbons.
  C. Voltolization of unsaturated hydrocarbons, their mixtures, and the like.
IV. Organic synthetic lubricants:
  A. Alkyl esters of organic acids, e. g.:
    Alkyl lactates
    Alkyl oxalates
    Alkyl sebacates (2-ethylhexyl sebacate)
    Alkyl adipates
    Alkyl phthalates (dioctyl phthalates)
    Alkyl ricinoleates (ethyl ricinoleate)
    Alkyl benzoates
  B. Alkyl, alkylaryl esters of inorganic acids, e. g.: such as the phosphorus esters.

This particularly desirable class of oleaginous bases for the present compositions comprises organic phosphorus esters including phosphates, phosphonates, phosphinates, as well as the corresponding oxides. Typical species include:

Tricresyl phosphate
Trioctyl phosphate
Tributyl phosphate
Bis(3,5,5-trimethylhexyl) 2,4,4-trimethylpentene phosphonate
Tris(3,5,5-trimethylhexyl) phosphate
N-heptenyl bis(3-butylpentane) phosphinate
Bis(3,5,5-trimethylhexane) octane phosphine oxide Another highly desirable type of phosphorus lubricants includes the diphosphorus compounds including the four classes referred to above. Preferably, the diphosphorus compounds have a configuration as follows:

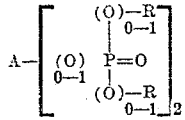

wherein A is an organic radical preferably aliphatic or aromatic hydrocarbon radical or alternatively an oxahydrocarbon radical or the corresponding sulfur, selenium or tellurium containing hydrocarbon radicals preferably saturated aliphatic hydrocarbon radicals having from 4 to 12 carbon atoms. The above configuration contemplates diphosphates, diphosphonates, diphosphinates and diphosphine oxides. A particularly desirable configuration comprises those diphosphates having the following configuration:

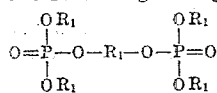

wherein each $R_1$ is an aliphatic hydrocarbon radical having from 2 to 6 carbon atoms. It has been found that lubricants of this particular configuration possess unexpectedly extreme low temperature operating characteristics. Species of such lubricants include:

1,4-butanediol bis(dibutyl phosphate)
1,3-propanediol bis(diamyl phosphate)

V. Synthetic lubricants made by polymerization of alkylene oxides and glycols at elevated temperatures in the presence of catalysts such as iodine, hydriodic acid, etc.
  A. Polymers of alkylene glycol:
    Trimethylene glycol
    Propylene glycol
    Tetramethylene glycol
    Hexamethylene glycol
    Pentamethylene glycol
  B. Copolymers of:
    Trimethylene glycol and triethylene glycol
    Trimethylene glycol and hexamethylene glycol
    Trimethylene glycol and B-methyltrimethylene glycol
    Trimethyl glycol and diethylene glycol
  C. Copolymers prepared from certain epoxides at elevated temperatures and in presence of KOH or $BF_3$-ether catalyst, e. g.:
    Ethylene oxide and propylene oxide
    Isobutylene oxide and propylene oxide
    Epichlorohydrin and propylene oxide
  D. Sulfur containing polymers obtained by treating allyl alcohol, divinyl ether, diallyl ether, diallyl sulfide, dimethallyl ether, glycols, with $H_2S$ in presence of a catalyst such as toluene sulfonic acid, peroxides, ultraviolet light, e. g.:
    Dihydroxy diethyl sulfide
    Dihydroxy dipropyl sulfide
    Trimethylene glycol and dihydroxy dipropyl sulfide
    Trimethylene glycol and dihydroxy diethyl sulfide
VI. Polymers obtained from oxygen-containing heterocyclic compounds, e. g., polymerization of tetrahydrofuran in the presence of a catalyst.
VII. Silicon polymers, e. g.:
  Polyalkyl siloxane and silicate polymers
  Alkylaryl siloxane and silicate polymers
  Dimethyl siloxane and silicate polymers, etc.

The proportion of soap present in the compositions of this invention is preferably related to the weight of the inorganic gelling material and more preferably to the surface area of said material. The best water-proofing is obtained by the use of a sufficient amount of soap to provide a mono-molecular layer thereof over substantially the entire inorganic gel surface. In the usual inorganic gels such as those described hereinbefore for grease preparation, the amount of soap will ordinarily be present as a minor constituent based on the gel content, i. e., the amount of soap will not be greater than the amount of inorganic gel. Effective water proofing is ordinarily obtained by the use of approximately 10–50% of soap based on the weight of the inorganic gelling agent. Optimum results are usually obtained by the use of 15–35% by weight of the agent. If other surface active hydrophobic agents are present in the composition, the amount of soap may be reduced if the only object of its presence is for the enhancement of water proofing. If, however, the soap is also designed to impart gelling action of its own to supplement the gelling action of the inorganic gel then the presence or absence of other surface-active agents does not materially affect the soap requirement.

Other suitable surface-active agents useful either in promoting the "direct transfer" of the hydrogel to oil or for promoting the water resistance of the grease include especially cationic-hydrophobic surface-active agents. The latter class of compounds includes especially amines, amine salts, amino amides, and -onium compounds. The latter term is meant to describe quaternary ammonium derivatives and their corresponding sulfonium, stibonium, sulfonium and other onium derivatives. These cationic surface-active materials may be present in an amount of about 10–50% based on the weight of inorganic gel. They are particularly suitable for use in conjunction with the sulfonates or with the dicarboxylates for the production of greases gelled primarily with the inorganic gel but exhibiting minimum corrosion characteristics. Typical species of hydrophobic cationic surface-active agents include heptadecylamine, dimethyldicetylammonium chloride, polyamino derivatives, such as the aminoamide of stearic acid with triethylene tetramine or the aminoamide of tall oil acids with the condensation product of epichlorohydrin and ammonia.

Other materials may be present in these greases in minor amounts without departing from the spirit of the present invention. These include the presence of corrosion inhibitors, such as sodium nitrite, oxidation inhibitors such as phenyl alpha-naphthylamine, viscosity index improving agents such as polymerized esters of the acrylic acid series including $C_6$–$C_{10}$ esters of polymethacrylic acids and extreme pressure agents such as sulfurized oleic acid.

The examples which follow illustrate the compositions of the present invention.

Example I

A one per cent solution of aluminum stearate in a high viscosity index mineral oil was heated to 160° C. and intimately mixed with a silica aerogel to produce a grease containing about 10% of the aerogel. A second grease was prepared omitting the aluminum stearate. The latter grease disintegrated rapidly when in contact with water while the former grease was found to be highly resistant to the action of either hot or cold water. The protection was improved by increasing the amount of aluminum stearate to either 20%, 25% or 30% based on the weight of the silica.

Example II

Greases were prepared as described in Example I, using aluminum 12-hydroxy stearate as the soap. Greases having outstanding water resistant characteristics were obtained when the amount of soap was varied between 10% and 20% by weight based on the silica.

Example III

By using lead 12-hydroxystearate and silica aerogel, greases were obtained having high water resistance when the soap was present in amounts varying from 10–20% by weight based on the silica.

Example IV

A lead soap was obtained by saponification of petroleum naphthenic acids having a molecular weight of about 300. When greases were prepared having between 30 and 40% of the lead naphthenate, based on the weight of silica aerogel, excellent water proofness was exhibited.

Example V

Results corresponding to the above example were obtained by the use of 25–30% lead stearate.

Example VI

An alumina hydrogel was dehydrated by replacement of the water with ethyl alcohol. The resulting alcogel was added to a mineral lubricating oil containing aluminum stearate in an amount of 15% based on the weight of alumina. The ingredients were milled to produce a fine dispersion after which the temperature was raised to evaporate the alcohol. The resulting composition was then milled to a grease consistency. This grease was found to have excellent resistance to the disintegrating action of water. A similar grease prepared with alumina by the alcohol transfer process but not including aluminum stearate disintegrated rapidly when mixed with water.

Example VII

A grease was prepared containing 10% silica and aluminum stearate in an amount of 10%, based on the weight of the silica. This grease was subjected to a roll test wherein the grease was churned by a heavy steel roller at room temperature. The penetration of the grease was tested periodically. It was found that 120 hours were required to cause the grease to soften to 230 micropenetration. A similar grease, omitting aluminum stearate, required only 34 hours in the same apparatus to reach 230 micropenetration.

Example VIII

When greases are prepared containing a gel composition of 97% silica and 3% magnesia and also containing 35% of the beryllium soap of octadecylsuccinic acid, these compositions exhibit excellent water proof characteristics.

Example IX

A grease is synthesized by the addition of a silica hydrogel to a mineral oil containing lithium sulfonate having a molecular weight of about 400 in an amount of about 40% based on the weight of the silica. The ingredients are milled and then subjected to a temperature of about 300° C. to eliminate water from the composition after which the dehydrated composition is raised to a temperature of approximately 580° C. After heating to this temperature the ingredients are cooled and milled to produce a grease. The resulting composition is exceptionally stable in the presence of water.

Example X

A grease can be prepared by milling 7% by weight of a mixture of 2 parts alumina aerogel and 1 part lead oleate with 93% bis(2-ethylhexyl)sebacate to obtain a grease having excellent water resistant properties.

This is a continuation-in-part of application Serial Number 782,695, filed October 28, 1947, now abandoned.

I claim as my invention:

1. A non-aqueous gelled lubricating composition comprising a major amount of petroleum lubricant, a silica aerogel, the latter being present in an amount at least sufficient to impart a gelled structure to the composition, and from about 10% to about 50% by weight, based on the aerogel, of aluminum stearate.

2. A non-aqueous gelled lubricating composition consisting essentially of a major amount of a petroleum lubricant, a silica aerogel, the latter being present at least in an amount sufficient to impart a gelled structure to the composition, and from about 10% to about 50% by weight, based on the aerogel, of an aluminum soap of 12-hydroxy stearic acid.

3. A non-aqueous gelled composition comprising an oleaginous material, a normally hydrophilic inorganic aerogel, and from about 10% to about 50% by weight, based on the aerogel, of a hydrophobic polyvalent metallic salt of an organic acid.

4. A non-aqueous lubricating composition consisting essentially of a major amount of a petroleum lubricant as essential liquid phase having dispersed therethrough a silica aerogel, the latter being present in an amount sufficient to impart a gelled structure to the lubricant, and from about 10% to about 50% by weight, based on the aerogel, of an aluminum soap of a soap-forming hydroxy fatty acid.

5. A substantially non-aqeuous lubricating composition comprising a major amount of a lubricating oil as the essential liquid phase having dispersed therethrough an anhydrous preferentially water wettable alumina-containing inorganic gel retaining in said composition the structure of the solid phase substantially as originally formed and being present in an amount sufficient to impart a gelled structure to said lubricant, and from about 10% to about 50% by weight, based on the inorganic gel, of a hydrophobic polyvalent metallic salt of a soap-forming organic acid.

6. A non-aqueous lubricating composition comprising a major amount of a lubricating oil as the essential liquid phase having dispersed therethrough an anhydrous preferentially water wettable inorganic gel in a colloidal state capable of forming a grease with said lubricant and a minor amount based on the inorganic gel of a hydrophobic metallic soap of a soap forming organic acid, the amount of said soap being at least sufficient to provide a mono-molecular layer on the surfaces of the gel.

7. A non-aqueous lubricating composition comprising a major amount of a lubricating oil as the essential liquid phase having dispersed therethrough an anhydrous preferentially water wettable inorganic gel in a colloidal state capable of forming a grease with said lubricant and a minor amount based on the inorganic gel of a hydrophobic metallic soap of a soap forming sulfonic acid having a molecular weight of at least 300, the amount of said soap being at least sufficient to substantially improve the resistance of the grease to disintegration from the action of water.

8. A substantially non-aqueous lubricating composition comprising a major amount of a lubricating oil as the essential liquid phase having dispersed therethrough an anhydrous water wettable inorganic gel having a surface area of between about 200 and 750 square meters per gram and being present in an amount sufficient to impart a gel structure to said lubricating oil and a minor amount based on the inorganic gel of a hydrophobic metallic soap of a soap forming organic acid, the amount of said soap being at least sufficient to substantially improve the resistance of the grease to disintegration from the action of water.

9. A substantially non-aqueous lubricating composition comprising a major amount of a lubricating oil as the essential liquid phase having dispersed therethrough an anhydrous preferentially water wettable inorganic gel having an average particle size between about 5 and about 100 millimicrons and being present in an amount sufficient to impart a gel structure to said lubricant and a minor amount based on the inorganic gel of a hydrophobic metallic soap of a soap forming organic acid, the amount of said soap being at least sufficient to substantially improve the resistance of the grease to disintegration from the action of water.

10. A substantially anhydrous lubricating composition comprising a major amount of a lubricating oil as the essential liquid phase having dispersed therethrough a hydrophilic inorganic gel in an amount sufficient to and in a colloidal state capable of forming a grease-like structure with said lubricating oil and a minor amount based on the weight of the inorganic gel of a hydrophobic metallic soap of a soap-forming organic acid, the amount of said soap being at least sufficient to substantially improve the resistance of the composition to disintegration by the action of the water.

11. A substantially non-aqeuous lubricating composition comprising a major amount of a lubricating oil as the essential liquid phase having dispersed therethrough an anhydrous water wettable inorganic gel having a surface area of between about 200 and 750 square meters per gram and being present in an amount sufficient to impart a gel structure to said lubricating oil and from about 15% to about 35% based on the inorganic gel of a hydrophobic metallic soap of a soap forming organic acid, the amount of said soap being at least sufficient to substantially improve the resistance of the grease to disintegration from the action of water.

12. A substantially anhydrous lubricating composition comprising a major amount of a petroleum lubricating oil as the essential liquid phase having dispersed therethrough a hydrophilic inorganic silicate gel in an amount sufficient to and in a colloidal state capable of forming a grease-like structure with said lubricating oil and a minor amount based on the weight of the silicate gel of a hydrophobic polyvalent metal soap of a soap-forming aliphatic carboxylic acid, the amount of said soap being at least sufficient to substantially improve the resistance of the composition to disintegration by the action of water.

13. A substantially anhydrous lubricating composition comprising a major amount of a petroleum lubricating oil as the essential liquid phase having dispersed therethrough a hydrophilic inorganic oxide gel in an amount sufficient to and in a colloidal state capable of forming a grease-like structure with said lubricating oil and a minor amount based on the weight of the oxide gel of a hydrophobic polyvalent metal soap of a soap-forming aliphatic carboxylic acid, the amount of said soap being at least sufficient to substantially improve the resistance of the composition to disintegration by the action of water.

FRED H. STROSS.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,531,440 | Jordan | Nov. 28, 1950 |
| 2,554,222 | Stross | May 22, 1951 |